US009478248B2

(12) United States Patent
Cordle et al.

(10) Patent No.: US 9,478,248 B2
(45) Date of Patent: Oct. 25, 2016

(54) ADAPTIVE HAMR LASER POWER DATA STORAGE DEVICE

(71) Applicant: Seagate Technology LLC, Cupertino, CA (US)

(72) Inventors: Michael A. Cordle, Eagan, MN (US); Franklin P. Martens, Minneapolis, MN (US); Alfredo Sam Chu, Prior Lake, MN (US); Shawn Stephen Silewski, Eden Prairie, MN (US); Tim Rausch, Farmington, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/512,590

(22) Filed: Oct. 13, 2014

(65) Prior Publication Data

US 2016/0055881 A1 Feb. 25, 2016

Related U.S. Application Data

(60) Provisional application No. 62/040,565, filed on Aug. 22, 2014.

(51) Int. Cl.

| | |
|---|---|
| ***G11B 5/40*** | (2006.01) |
| ***G11B 20/10*** | (2006.01) |
| ***G06F 11/07*** | (2006.01) |
| ***G11B 20/18*** | (2006.01) |

(Continued)

(52) U.S. Cl.

CPC ....... *G11B 20/10388* (2013.01); *G06F 11/073* (2013.01); *G06F 11/076* (2013.01); *G11B 5/40* (2013.01); *G11B 5/455* (2013.01); *G11B 5/6088* (2013.01); *G11B 19/048* (2013.01); *G11B 20/182* (2013.01); *G11B 20/1816* (2013.01); *G11B 2005/0021* (2013.01)

(58) Field of Classification Search

CPC .................... G11B 11/1053; G11B 11/10595; G11B 19/04; G11B 2005/0005; G11B 20/10; G11B 20/1816; G11B 20/182; G11B 2220/216; G11B 27/36; G11B 5/02; G11B 5/3967; G11B 5/40; G11B 5/6064; G11B 5/607; G11B 20/22; G11B 2220/2516; G11B 5/59688; G11B 5/012; G11B 2005/0018; G11B 5/455; G11B 2005/0016; G11B 2220/20; G11B 5/4806; G11B 5/3166; G11B 19/048; G11B 2005/0008; G11B 2005/0013; G11B 2005/0021; G11B 33/10; G11B 5/187; G11B 5/4555; G11B 5/5534; G11B 5/59611; G11B 5/6005; G11B 5/6088; G06F 11/073; G06F 11/076

See application file for complete search history.

(56) References Cited

U.S. PATENT DOCUMENTS

| | | |
|---|---|---|
| 5,450,383 A | 9/1995 | Call et al. |
| 6,636,468 B2 | 10/2003 | Salmonsen et al. |

(Continued)

FOREIGN PATENT DOCUMENTS

| | | |
|---|---|---|
| WO | 02077978 A1 | 10/2002 |

*Primary Examiner* — Dionne H Pendleton

(74) *Attorney, Agent, or Firm* — Hall Estill Attorneys at Law

(57) ABSTRACT

A data storage device and associated methods may provide at least a data storage medium that is separated from a heat assisted magnetic recording data writer and is connected to a controller. The controller can be configured to change a laser power of the heat assisted magnetic recording data writer in response to a tested bit error rate of a median data track of a plurality of adjacent data tracks reaching an identified threshold.

19 Claims, 5 Drawing Sheets

250 LASER POWER ADAPTATION ROUTINE
252 WRITE MEDIAN DATA TRACK WITH PREDETERMINED LASER POWER
254 WRITE ADJACENT DATA TRACKS A PREDETERMINED NUMBER OF TIMES
256 MEASURE BER FOR MEDIAN DATA TRACK
258 INCREASE POWER? YES / NO
260 SET LASER POWER FOR HAMR DATA WRITER

(51) Int. Cl.

| | |
|---|---|
| ***G11B 5/60*** | (2006.01) |
| ***G11B 19/04*** | (2006.01) |
| ***G11B 5/455*** | (2006.01) |
| *G11B 5/00* | (2006.01) |

(56) References Cited

U.S. PATENT DOCUMENTS

| | | | | |
|---|---|---|---|---|
| 6,813,107 | B1 | 11/2004 | Lee | |
| 7,220,500 | B1 * | 5/2007 | Tomiyasu | G11B 5/455 428/831 |
| 7,505,387 | B2 | 3/2009 | Kim et al. | |
| 7,952,970 | B2 | 5/2011 | Lee | |
| 7,969,839 | B2 | 6/2011 | Lee | |
| 8,279,733 | B2 | 10/2012 | Chang | |
| 9,007,882 | B1 * | 4/2015 | Hur | G11B 5/455 360/31 |
| 9,025,268 | B1 * | 5/2015 | Taratorin | G11B 20/182 360/45 |
| 2005/0157620 | A1 * | 7/2005 | Narumi | G11B 7/0045 369/47.53 |
| 2006/0132963 | A1 * | 6/2006 | Morinaga | G11B 5/02 360/75 |
| 2008/0049352 | A1 * | 2/2008 | Yamanaka | G11B 5/02 360/59 |
| 2008/0198492 | A1 * | 8/2008 | Ahn | G11B 20/1816 360/31 |
| 2015/0380019 | A1 * | 12/2015 | Deen | G11B 5/11 360/125.32 |

* cited by examiner

ADAPTIVE HAMR LASER POWER DATA STORAGE DEVICE

RELATED APPLICATION

This application makes a claim of domestic priority to U.S. Provisional Patent Application No. 62/040,565 filed Aug. 22, 2014, the contents of which are hereby incorporated by reference.

SUMMARY

In accordance with various embodiments, a data storage device may have a data storage medium that is separated from a heat assisted magnetic recording data writer and is connected to a controller. The controller can be configured to change a laser power of the heat assisted magnetic recording data writer in response to a tested bit error rate of a median data track of a plurality of adjacent data tracks reaching an identified threshold.

DETAILED DESCRIPTION

Proliferation of mobile computing devices, such as smartphones, tablet computers, and laptop computers, has increased the amount of data generated, transferred, and consumed. Larger volumes of data being generated and stored have stressed the data storage capacity of solid-state and rotating hard disk drive data storage systems. The advent of heat assisted magnetic recording (HAMR) data writers has potential to elevate the capacity of data storage systems without increasing the physical size or form factor of the data storage components. However, HAMR data writers can pose difficulties to data writing performance when the HAMR components are not tuned to the corresponding data storage environment that reduces the data capacity and data access reliability of a device.

Accordingly, assorted embodiments configure a data storage device having at least a HAMR data writer separated from a data storage medium and connected to a controller that changes a laser power of the HAMR data writer in response to a bit error rate of a median data track of a plurality of adjacent data tracks. The ability to tune the laser power of the data writer can optimize the performance of the data storage device by extending the life of the laser assembly and minimizing inadvertent data bit alteration, such as through adjacent track interference. An adapted laser power can be selected in a variety of manners and can account for design and process variations in the laser assembly and data storage medium to provide optimized data bit programming.

Figure 1:
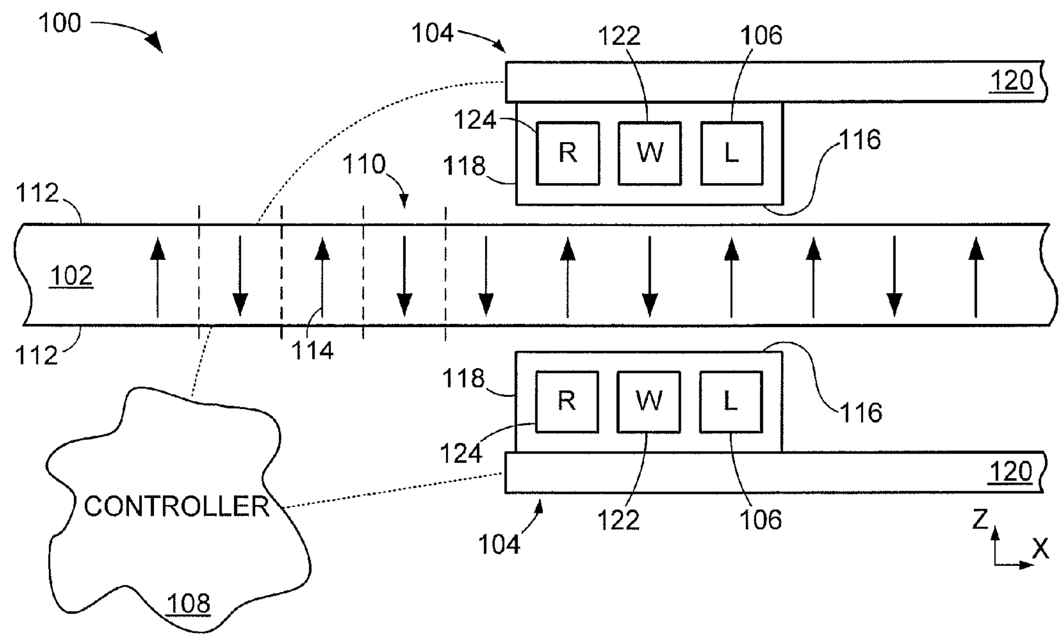
FIG. 1 depicts a block representation of a portion of an example data storage system arranged in accordance with some embodiments.

While not necessarily limiting, various embodiments utilize a tuned laser assembly incorporated into a rotating data storage hard disk drive. FIG. 1 displays a block representation of a portion of an example data storage system 100 configured in accordance with some embodiments to provide perpendicular data writing and reading. A data storage medium 102 can take an unlimited variety of forms, but can be configured to accommodate optics heating of various portions of the medium 102 to increase data storage speed and capacity. An example data storage medium 102 configuration may consist of a substrate, a soft underlayer, one or more intermediate layers, one or more recording layers, and a protective carbon overcoat. A layer of lubricant may be applied to the overcoat to reduce damage from contact between the medium 102 and a read/write transducing assembly 104 that is used to transduce data to and from the medium 102.

With the transducing assembly 104 employing a laser assembly 106, HAMR data writing techniques can be provided that generally involve using a source of thermal energy, such as a laser, to apply localized heating to a magnetic storage medium. The heating temporarily reduces the magnetic coercivity and anisotropy energy of a magnetic recording layer of the medium 102, which allows an applied magnetic field from the transducing assembly 104 to write data to the recording layer. The written area quickly cools, restoring the former high coercivity and anisotropy energy state that maintains programmed data polarities. Such HAMR techniques can potentially support recorded data bit densities in the range of around 10 to 40 terabits/in$^2$ ($10^{12}$ bits/in$^2$) or more.

Through a relatively small, focused optical beam, heating of adjacent areas on the medium 102 not subject to a write operation can be avoided while the power level of the beam is sufficiently high to ensure the localized area is heated sufficiently to enable the transducing assembly 104 to write the data to the area. One example write beam size found to provide adequate operational performance in some cases delivers over about 50 microwatts, μw ($10^{-6}$ watts) to a spot size of no more than about 30 nanometers, nm ($10^{-9}$ meters). To facilitate HAMR techniques, the data storage system 100 can separate the transducing assembly 104 from the rotatable data recording medium 102 by an air bearing.

Generally, the medium 102 and the transducing assembly 104 may be incorporated into a data storage device in which multiple axially arranged recording media (discs) and HAMR data transducing assemblies are used to read and write user data provided by a local or remote host controller. In some embodiments, data is stored on the medium 102 along a number of data tracks 110 arranged in a pattern along a recording surface 112 of the medium 102. The data may be stored in the form of grains and data bits 114 addressable as user data sectors of fixed size along the tracks 110. Hydrodynamic features, such as an air bearing surface 116, may be provisioned on a facing surface of a head 118 suspended from a slider 120 to enable a data writer 122 and data reader 124 to program and sense magnetic polarities of the various data bits 114. It is contemplated that the data reader 124 takes the form of a magneto-resistive (MR) sensor while the data writer 122 utilizes a write coil and one or more magnetically permeable cores to generate magnetic flux that is passed to the medium 102. The laser assembly 106 may take the form of a laser diode, a near field transistor (NFT), or other radiation beam and/or thermal energy source that can selectively heat portions of the medium 102 to aid the speed and efficiency of programming data bits 114 with the data writer 122.

During a read operation, the data reader 124 operates to sense a magnetization sequence written to the medium 102 along a portion of a selected track 110. During a write operation, the laser assembly 106 projects a high powered irradiation "dot" on the rotating medium 102 to locally increase the temperature of the medium, and the data writer 122 directs magnetic flux into the heated portions of the medium to write a desired magnetization sequence. It will be appreciated that the system represented in FIG. 1 can be readily adapted for a non-HAMR application, in which case the laser assembly 106 is omitted. It has been found, for example, that formulations of media as disclosed herein are suitable for use in a wide variety of media, such as ECC+ CGC perpendicular recording media.

As noted above, the HAMR light source provides localized heating to temporarily reduce the anisotropy energy of the magnetic bit locations in the medium so that the electromagnetic writer element can write to the bit locations. The light beam in a HAMR application will tend to be many times smaller than its diffraction limit to avoid undesirable heating of adjacent areas, while the power level of the beam is set to be sufficiently high to accomplish the task of reducing the medium magnetic anisotropy energy. Near field transducers (NFTs) are sometimes used to meet these beam size and power level requirements.

Figure 2:
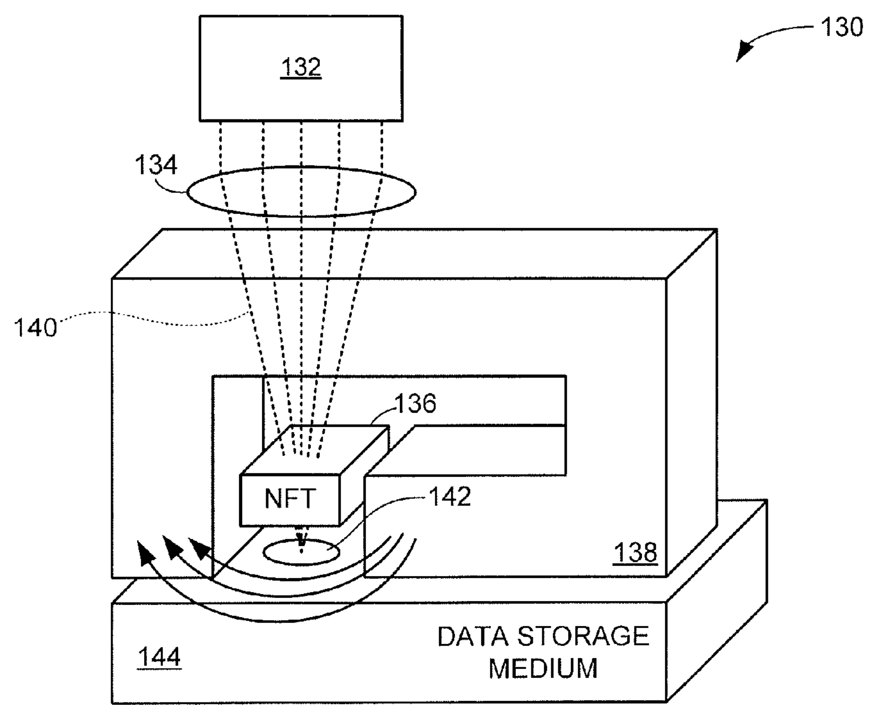
FIG. 2 is a block representation of a near-field based heat assisted magnetic recording (NFT-HAMR) system that may be utilized in the system of FIG. 1.

FIG. 2 represents an NFT-based HAMR system 130 with a light source 132, a condenser 134, an NFT 136, and a magnetic writer structure 138. The condenser 134 represents a first stage and the NFT 136 represents a second stage. These elements cooperate to direct an electromagnetic radiation (e.g., light) beam 140 onto a small spot 142 on a medium 144. It is contemplated that the spot has a diameter of no more than about 30 nm and is provided with sufficient transmitted power as to reduce the magnetic coercivity and anisotropy energy of the medium. As such, the NFT 136 can enhance the light efficiency by combining various effects such as plasmonic resonance, surface enhancement, lightening rod collection, etc.

Figure 3:
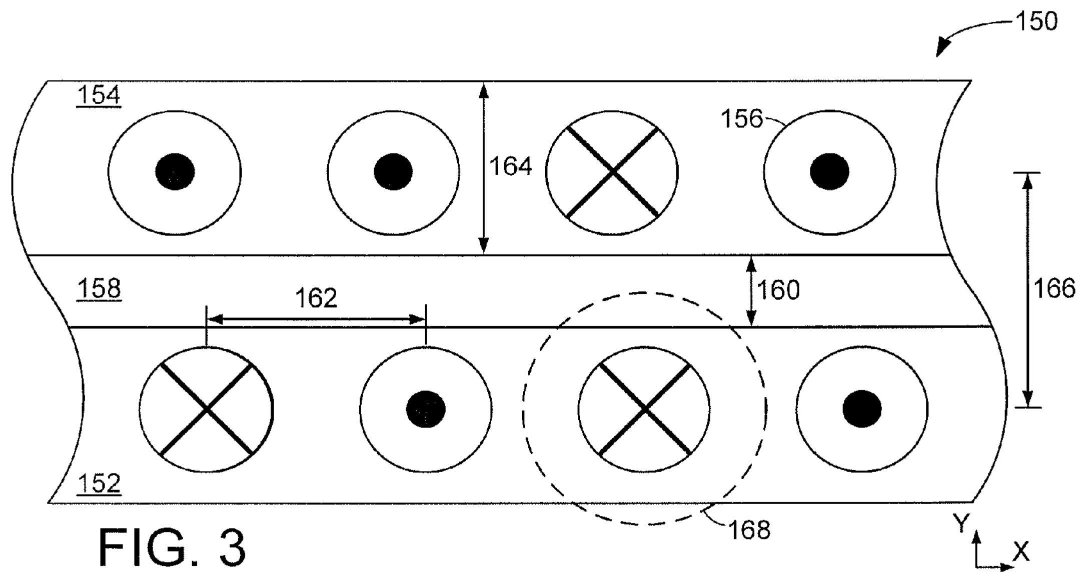
FIG. 3 shows a portion of an example data storage system configured in accordance with various embodiments.

Through the use of the HAMR system 130, the areal data bit density of the medium 144 can be optimized. FIG. 3 is a top view block representation of a portion of an example data storage system 150 configured to utilize HAMR components and data writing techniques in accordance with various embodiments. The data storage system 150 has first 152 and second 154 data tracks that respectively store a plurality of data bits 156. The data tracks 152 and 154 are separated by an erase band 158 that has a length 160 along the Y axis that allows for process and operational variations while maintaining the data tracks 152 and 154 as adjacent data storage repositories.

The areal data bit density of the data storage system 150 can be characterized as the combined number of data tracks with the linear spacing between data bits 156, which are shown as distance 162. In the past, making the data track pitch 164 and linear data bit spacing 162 smaller has increased the areal data bit density. However, spacing on a nanometer scale has come close to reaching the operational limits of the materials and data storage components. That is, the ability of a data writer and reader to respectively program and sense magnetic polarities of individual data bits 156 can be muddled and imprecise if the track pitch 164 and linear spacing 162 are decreased too much. Hence, HAMR techniques can be utilized to increase the data bit resolution of a data writer, which allows the linear spacing 162 and track pitch 164 to be reduced.

Although the use of HAMR data writing techniques can allow for increased areal data bit density, the power utilized by a heat source, such as a laser assembly, can pose difficulties for programming data in high areal data bit density environments. For example, increasing the laser power for a HAMR data writer can allow for a narrower track pitch 164, but can decrease data bit 156 signal-to-noise ratios that correspond with larger linear spacing 162. As another example, decreasing laser power can increase data bit 156 signal-to-noise ratios and decrease linear spacing 162, but can increase track pitch 164, separation distance 160, and adjacent track distance 166 in an effort to ensure the heating extent 168 of the laser does not inadvertently heat adjacent data tracks, which can cause unwanted data bit errors in what can be characterized as thermal erasure.

It is contemplated that the areal data bit density of a data storage medium can be optimized to a variety of different values by tuning the laser power of a HAMR data writer to the track pitch 164 and adjacent track distance 166. That is, a HAMR data writer may be capable of multiple different areal data bit densities depending on the laser power and spacing of the various data tracks and bits. While laser power may be tuned, in some embodiments, by finding the lowest bit error rate for a data track written with HAMR techniques, such tuning may not be precise enough to provide laser power that optimizes the areal data bit density corresponding with the linear spacing 162, track pitch 164, and track separation 166 of the data storage medium.

The imprecision of simple bit error rate laser power tuning can be improved by carrying out the example data through the example laser power adaptation routine 170. In accordance with assorted embodiments, a median data track can be written with a HAMR data writer in step 172 using a predetermined laser power. Steps 174 and 176 can successively or concurrently write data, such as a test pattern, with the predetermined laser power to first and second data tracks positioned immediately adjacent to the median data track. During and after steps 172, 174, and 176, step 178 can measure the bit error rate (BER) for at least the median data track. Monitoring the BER for the median data track can indicate the quality and efficiency of the predetermined laser power.

In various circumstances, such as if the laser power was not high enough to enable the programming of data bits, steps 172, 174, and 176 can be revisited with a different laser power. Decision 180 evaluates and determines if the laser power used during the previous writing of the median data track is to be increased. A determination that more laser power is in order, routine 170 returns to step 172 and an increased laser power is used to program data. In the event a local or remote controller determines increased laser power is not in order, step 182 proceeds to set the laser power to the predetermined power value resulting in the BER in step 178.

Figure 5:
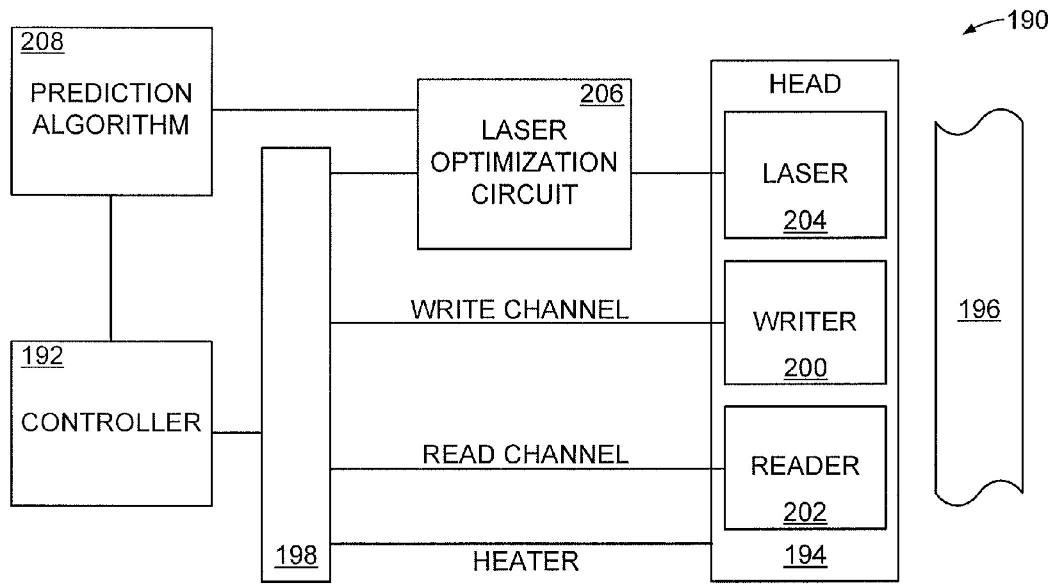
FIG. 5 provides a block representation of a portion of an example data storage system configured in accordance with various embodiments.

FIG. 5 displays a block representation of a portion of an example data storage device 190 that employs HAMR data writing techniques in accordance with some embodiments. The data storage device 190 has at least one controller 192 that monitors and directs activity in a transducing head 194 to sense and program data bits on a data storage medium 196. The controller 192 can be connected to the transducing head 194 with one or more control lines, such as the illustrated read channel, write channel, and heater lines. The control lines can be manipulated by at least one control structure, such as the multiplexer 198, to interconnect the data writer 200, data reader 202, and laser assembly 204 with the controller 192.

The laser assembly 204 of the transducing head 194 partially or completely controlled by a laser optimization circuit 206 that utilizes at least one prediction algorithm 208 and the controller 192 to test, set, and adapt the laser power utilized in conjunction with the data writer 200 to program data on the data storage medium 196. It is contemplated that the prediction algorithm 208 is stored locally, such as on a common printed circuit board as the controller 192, or remotely, such as off-site and connected via a network pathway. In accordance with various embodiments, the laser optimization circuit 206 along with the controller 192 can write test data and measure various bit error rates to identify an optimized laser power value that allows the data writer 200 to efficiently program data without stressing the laser assembly 204.

Figure 4:
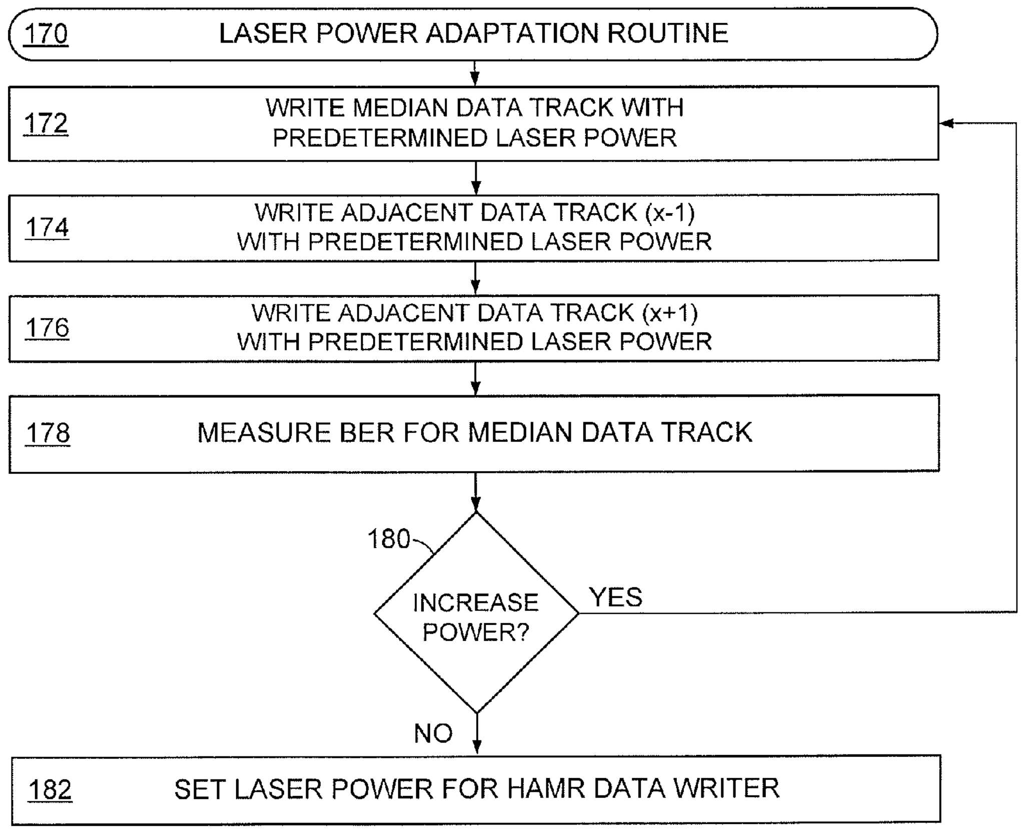
FIG. 4 illustrates an example laser power adaptation routine that data that may be conducted in accordance with some embodiments.
Figure 6:
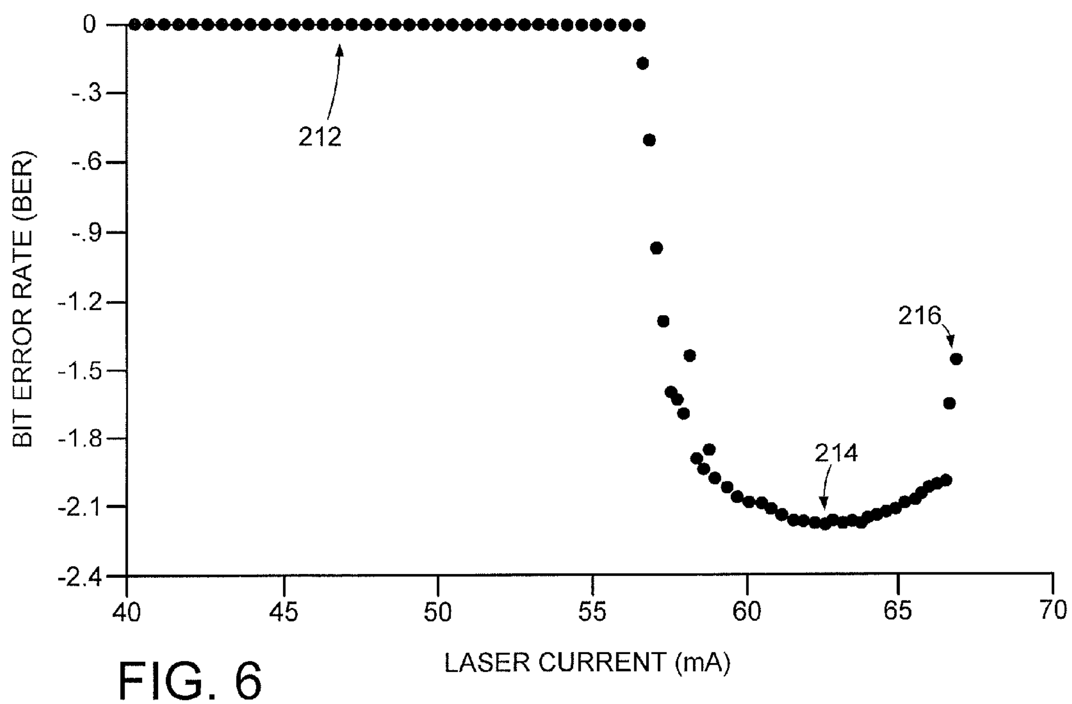
FIG. 6 graphs example operational data associated with a data storage system tuned in accordance with some embodiments.

The example operational data of FIG. 6 illustrates how the data storage device 190 of FIG. 5 can carry out routine 170 of FIG. 4 to provide various bit error rates for different laser currents. The assorted plot points show how numerous BERs can sweep up from a low laser power value that fails to program data bits, as displayed by 0 BER line 212, to higher laser powers that have varying BERs. It is contemplated that through the plotting of the different BERs for different laser powers, the laser power can be set for the smallest BER value, which would roughly be 62 mA as shown by point 214. In yet, a controller conducting the testing operation that produces the operational data of FIG. 6 would not immediately know the smallest BER value and corresponding laser power until an entire range of laser powers are tested.

By testing a range of laser powers, it is possible that higher laser currents are utilized, which can degrade laser assembly accuracy and operational life. Thus, various embodiments of the present disclosure are related to identifying an optimized laser power without unnecessarily writing data with high laser currents. The incremental increasing of laser power and the frequent monitoring of tested data track BER can allow a local or remote controller to identify when the BER values switch from a decreasing trend to an increasing trend. Referring to FIG. 6, a controller could use any statistical means, such as a moving average and standard deviation, to identify that the BERs have begun to increase at point 216.

The identification of a switch to an increasing BER trend can correspond to immediate stoppage of any laser power operation and the setting of laser power by the controller to the value associated with the lowest BER, such as point 214. The immediate halting of laser power operation prevents the HAMR components from getting prematurely overstressed and ensures the best possible BER for a particular transducing assembly. It is noted that the testing and optimization of a laser power can account for an unlimited variety of process and design variations that may be present in the transducing assembly and data storage medium. For example, track squeeze, non-concentric data tracks, and varying data bit linear spacing can each be accounted for through the customization of laser power in relation to actual data written to the data storage medium.

The customization of a HAMR transducing assembly to the corresponding data storage medium after the medium is installed and manufactured into a data storage device allows for the testing and setting of laser power to be conducted at any time. For example, laser power can be tested and set passively, such as during data storage device downtime, and in combination with other data operations, such as data reading operations. The customization of HAMR transducing assemblies may further result in different laser powers being used for different transducing assemblies of a data storage device. As such, each data storage medium surface of a data storage device can be tuned with similar or dissimilar laser power that actually optimizes BER, which is different than laser power that is tuned by testing less than all the data storage surfaces in a data storage device.

In some embodiments, the testing of various laser powers and track BER can correspond with a local or remote controller adjusting the areal data bit density of various portions of the data storage device. As a non-limiting example, a controller may adjust the data bit spacing, track pitch, and track separation distance to optimize the data bit density in relation to a set laser power. With the ability to adjust the data bit density of a data storage device without inducing high BER, data capacity of the device to be optimized.

Figure 7:
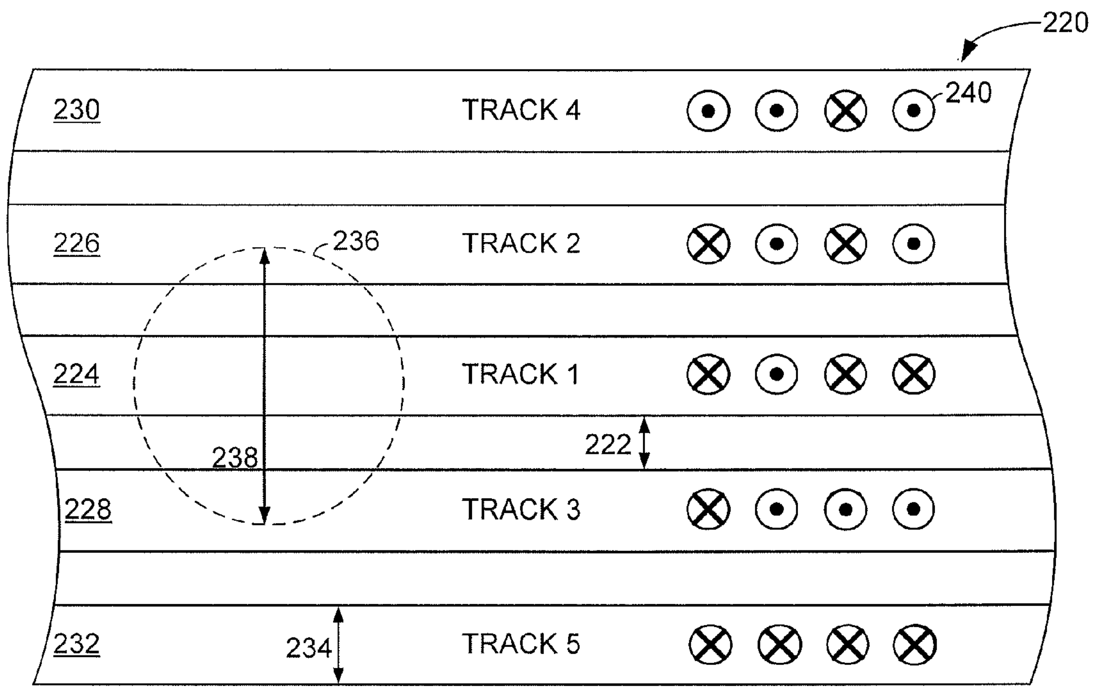
FIG. 7 shows a block representation of a portion of an example data storage system constructed and operated in accordance with some embodiments.

It is understood that even though various embodiments may optimize the performance of HAMR data writer, the use of a heating means can pose other difficulties. As mentioned above, the heating means of a HAMR data writer may heat a spot with a greater size than an individual data track. FIG. 7 displays a top view block representation of a portion of an example data storage medium 220 that can utilize a HAMR data writer in accordance with some embodiments. The data storage medium 220 has a plurality of data tracks designed with predetermined separation distances 222, but may have non-uniform separation distances due to any number of process variations. Similarly, the first 224, second 226, third 228, fourth 230, and fifth 232 data tracks can have uniform or non-uniform track pitches 234 either by design or by process variations.

When the heating means of an adjacent HAMR data writer is activated, the laser power of the heating means can correspond with a heating extent 236 that may be any shape and may extend across multiple adjacent data tracks, as shown. That is, the heating extent 236 may have a length 238 that is greater along the Y axis than the track pitch 234. The size of the heating extent 236 can inadvertently program, alter, and erase the programmed polarity of data bits 240 on data tracks adjacent to a selected data track. In the non-limiting example shown in FIG. 7, a HAMR data writer is programming the first data track 224 and the heating extent 236 extends partially into the second 226 and third 228 data tracks. A partial coverage of the adjacent data tracks 226 and 228 by the heating extent 216 leads to unpredictable data bit interference, also known as track erasure, which can be exacerbated by data track squeeze.

The unpredictability of track erasure conditions may be partially mitigated with the laser optimization circuit 206 of FIG. 5 and routine 170 of FIG. 4 to optimize a laser power value that corresponds with the lowest BER. The writing of the median data track as well as the data tracks immediately adjacent the median data track can account for some adjacent track interference. However, track erasure can be present and exaggerated with increasing numbers of data track writes. For example, the risk of track erasure can be small after 10 writes to a median data track, but considerably greater after 100 writes to the median data track. Thus, various embodiments conduct tests that adapt the laser power for a HAMR data writer to reduce the risk of track erasure and adjacent track interference conditions.

Figure 8:
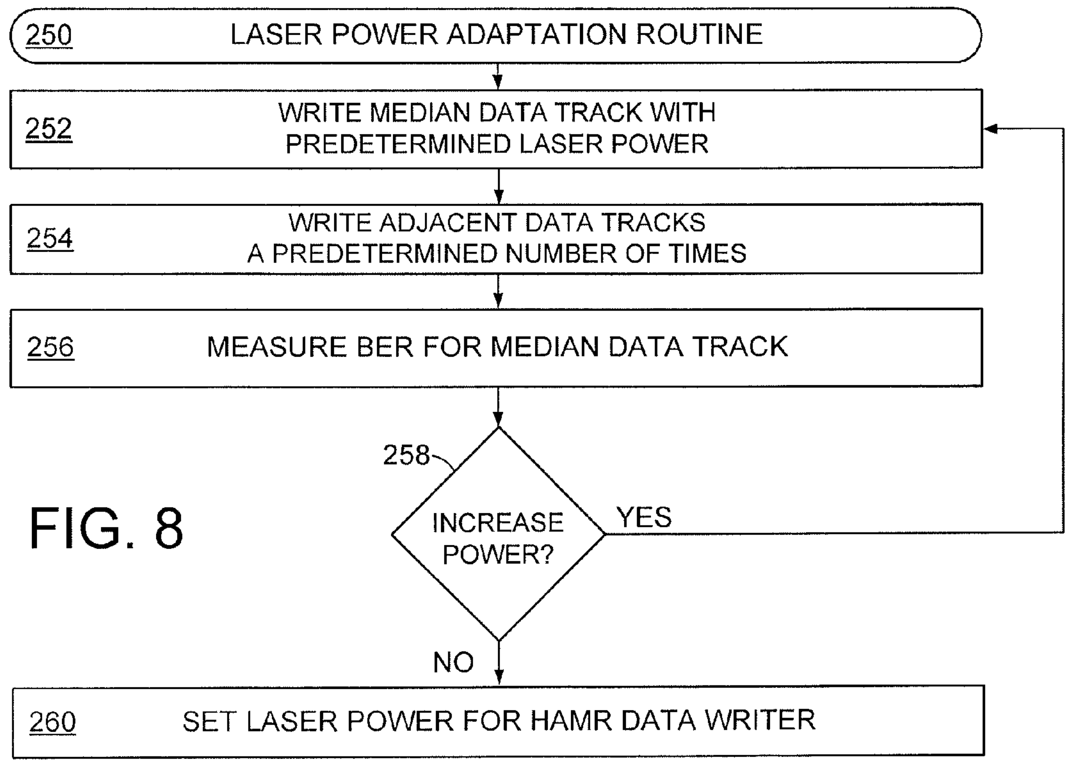
FIG. 8 is an example laser power adaptation routine that may be carried out in accordance with assorted embodiments.

FIG. 8 provides an example erasure laser power adaptation routine 250 that can be carried out in accordance with some embodiments. It is noted that the various steps of routine 250 will be referenced with the structure shown in FIG. 7, but the configuration of the various aspects in FIG. 7 are not required or limiting. Routine 250 can begin with the writing of data to a median data track 224 in step 252. The data written in step 252 may be user data or predefined test pattern data. In comparison with routine 170 that writes similar or dissimilar data to adjacent data tracks a single time, step 254 writes data to the adjacent data tracks 226 and 228 a predetermined number of times. The data written to the adjacent data tracks is dissimilar from the data written to the median data track 224 so that any influence onto the median data track 224 can be identified through the measuring of the median data track BER in step 256.

In other embodiments, data is repeatedly written to the median data track 224 and the BER of the adjacent data tracks 226 and 228 are measured and compared to arrive at the affect of different laser powers on the risk of track erasure conditions occurring. That is, the repeated writing of a median 224 or adjacent 226 and 228 data tracks can ensure the BER measured in step 256 reflects the risk and occurrence of adjacent track interference. Through decision 258, steps 252, 254, and 256 can be revisited for a different laser power, and assumedly a different laser extent. When a controller identifies that a BER trend for a given HAMR data writer is increasing, such as at point 216 of FIG. 6, step 260 can choose a laser power that is assigned to the tested HAMR data writer.

Figure 9:
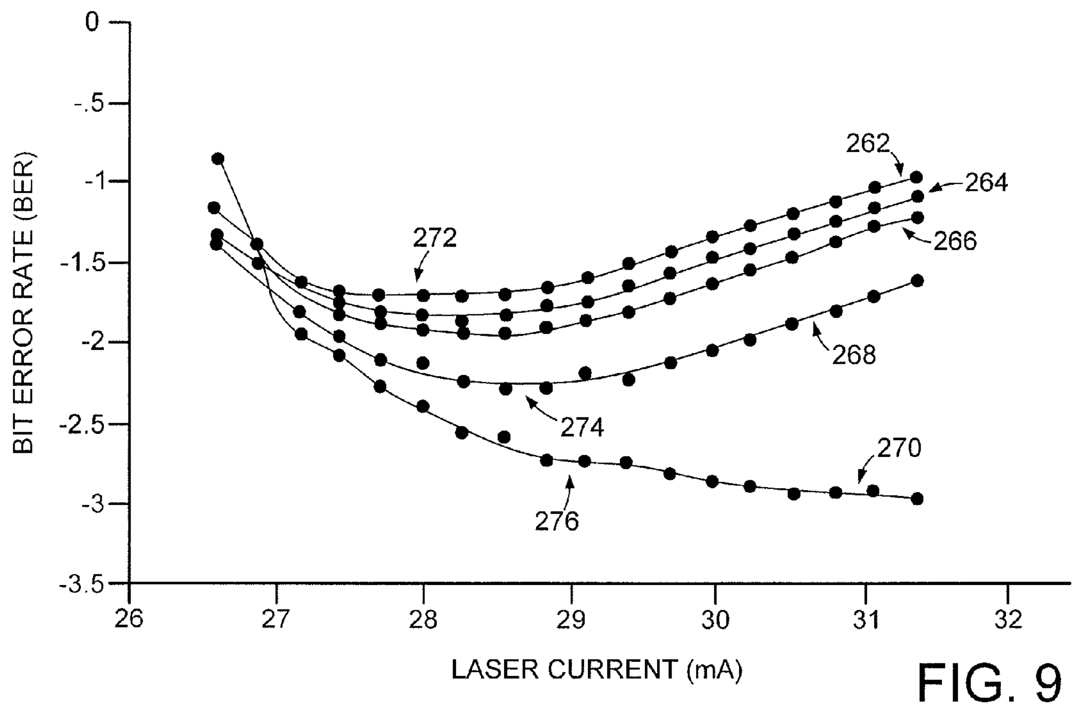
FIG. 9 graphs various operational data associated with a data storage system configured in accordance with various embodiments.

FIG. 9 conveys various non-limiting operational data that may be derived from conducting routine 250. Progression 262 corresponds with a single median data track write while progressions 264, 266, 268 and 270 respectively correspond with 1, 5, 10, and 20 adjacent track writes. The ability to tune the laser power of a HAMR data writer in relation to any number of data track writes and different BER values allows a controller to provide sophisticated customization of laser power assignment. For instance, the lowest BER corresponding to a single data track, as shown by performance BER 272, may not be the same as erasure BERs 274 or 276 that take into account a number of adjacent data track writes.

In the example shown in FIG. 9, a controller can elect a 28 mA laser power to provide the lowest BER and some risk of track erasure or a 29 mA laser power to provide an erasure BER that is not the lowest BER, but mitigates some risk of track erasure. That is, a controller may distinguish between two or more different laser powers that respectively provide different BERs and risks of track erasure before selecting a laser power in accordance with a predetermined data writing scheme. In other words, the controller can choose a laser power that may not provide the best BER for a median data track, but provides a balance between risk of track erasure and data bit programming performance.

It is contemplated that multiple different BER testing routines may be conducted to determine an optimized laser power. For instance, routine 170 may be conducted to determine a performance laser power that corresponds to the lowest BER based on a single data track write prior to routine 250 being conducted to determine an erasure laser power that corresponds to the lowest BER based on a predetermined number of data track writes, such as 10, 20, 50, or 100 writes. It is further contemplated that other tests and evaluations, such as data bit signal-to-noise ratio, may be conducted individually or concurrently with routines 170 and 250 to select a laser power that provides optimized data bit recording performance with customized mitigation of data track erasure.

Figure 10:
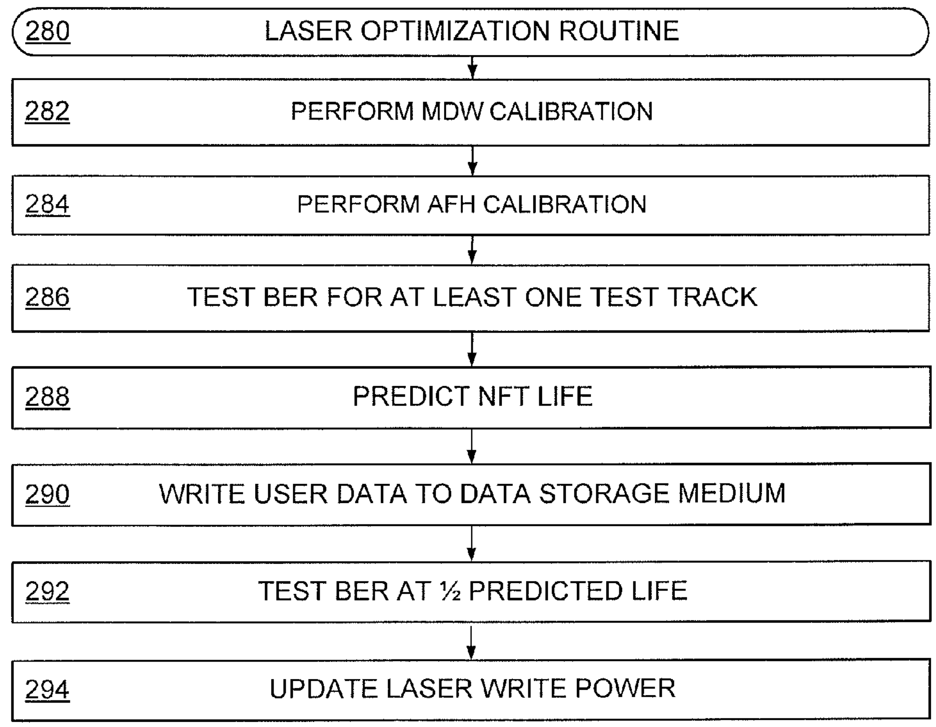
FIG. 10 provides an example laser optimization routine conducted in accordance with some embodiments.

FIG. 10 provides a flowchart of an example laser optimization routine 280 that can be conducted and revisited during manufacturing and user operation of a data storage device. During manufacturing, step 282 can perform multi-disk writer (MDW) calibrations that allow a plurality of data storage media to be formatted, such as with servo code. Step 284 can subsequently perform adaptive fly height (AFH) calibrations on at least one transducing head to set the fly height and heater signal adjustments that allow the transducing head to adapt to variations in the data storage media, such as thermal asperities.

Step 286 next tests the BER for at least one data track of a data storage medium to determine a baseline BER value. It is contemplated that step 286 is conducted using test data arranged in a test pattern on the data storage medium. At some time after the determination of the baseline BER in step 286, step 288 can predict the operational life of a laser assembly, such as the laser diode and near field transducer. The operational life may consist of the time the near field transducer is expected to reliably heat a predetermined spot size on a data storage medium. The operational life can correspond with any number of operational variables, such as time the laser diode is writing, time the laser diode is powered on, and number of data writes.

One or more controllers can then dictate the writing of user data to the data storage medium in step 290 with a laser power value selected based on the routines 170 and/or 250 while logging the time the laser diode is powered to standby and operational power levels. At approximately half the predicted life of the near field transducer, step 292 can test the BER for at least one data track to evaluate if the laser power can be adjusted to maximize the life of the near field transducer and optimize data programming operations. For example, if the tested BER in step 292 is different than the baseline BER tested in step 286, step 294 can update the laser power for one or more transducing heads in a data storage device to a different laser power value.

Alternatively, similar BER in steps 292 and 286 can cause step 294 to maintain the laser write power value previously set based on the baseline BER from step 286. It is noted that the various steps and decisions of routines 170, 250, and 280 are not required or limiting. As such, the various aspects can be moved, changed, and removed just as additional steps and decisions can be added. For example, routine 230 may further have steps and decisions added that write data one or more times to data tracks distal to the median data track, such as tracks 230 and 232 of FIG. 7.

Through the various embodiments of a HAMR data writer, a controller can adapt a laser power to actual data writing performance. The ability to recognize tested BER trends and immediately halt testing to ensure excessive laser power is not used allows the accuracy and longevity of a laser assembly to be optimized. The ability to test HAMR data writing performance for both performance and track erasure risk allows the controller to optimize writer performance for a variety of different data writing parameters, such as high areal data bit density or archive data storage.

Numerous characteristics and advantages of various embodiments of the present disclosure have been set forth in the foregoing description, together with structural and functional details. Nevertheless, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising a data storage medium separated from a heat assisted magnetic recording (HAMR) data writer connected to a controller configured to change a laser power of the HAMR data writer and predict a lifespan of a near-field transducer portion of the HAMR data writer in response to a tested bit error rate (BER) of a median data track reaching an identified threshold, the tested BER corresponding to writing a common test pattern to a first data track more than twice, the first data track being immediately adjacent to the median data track.

2. The apparatus of claim 1, wherein the identified threshold is a point at which the tested BER changes from a decreasing trend to an increasing trend.

3. The apparatus of claim 2, wherein the increasing and decreasing trends each correspond with a plurality of tested BER for the median data track over a plurality of different laser powers.

4. The apparatus of claim 1, wherein the controller is connected to a laser power optimization circuit configured to attain the tested BER from a read channel of the HAMR data writer.

5. The apparatus of claim 1, wherein the controller sets a laser maximum value in response to the tested BER reaching the identified threshold.

6. The apparatus of claim 5, wherein the laser power is less than the laser maximum value.

7. The apparatus of claim 5, wherein the controller restricts a laser of the HAMR data writer from experiencing a laser power value greater than the laser maximum value.

8. The apparatus of claim 1, wherein the controller halts a testing routine in response to the identified threshold being reached.

9. The apparatus of claim 1, wherein the controller calculates a plurality of different tested BER for a plurality of power values delivered to a laser of the HAMR data writer.

10. The apparatus of claim 1, wherein the controller writes data to first and second data tracks positioned immediately adjacent the median data track prior to testing for the tested BER.

11. A method comprising:

positioning a heat assisted magnetic recording (HAMR) data writer separate from a data storage medium;

writing data to a median data track;

programming a common test pattern to an adjacent data track more than once, the adjacent data track positioned immediately adjacent the median data track;

testing the HAMR data writer with a controller to obtain a plurality of tested bit error rates (BER) respectively corresponding to a plurality of different laser power values;

identifying a predetermined threshold in the plurality of tested BER;

selecting a laser power value from the plurality of tested BER; and predicting a lifespan of a near-field transducer with the controller after selecting the laser power value.

12. The method of claim 11, wherein the predetermined threshold corresponds with a threshold laser power value where the tested BER switches from a decreasing trend to an increasing trend.

13. The method of claim 12, wherein the selected laser power is less than the threshold power value.

14. The method of claim 11, wherein the controller halts the testing of the HAMR data writer in response one of the plurality of tested BER reaching the predetermined threshold.

15. The method of claim 11, wherein the controller identifies a lowest tested BER for the plurality of different laser power values, the selected laser power value being different than the lowest tested BER.

16. The method of claim 11, wherein the adjacent data track is programmed with the common test pattern five times or more.

17. The method of claim 11, wherein the controller selects the laser power value to minimize risk of thermal erasure conditions.

18. A method comprising:

connecting a controller to a heat assisted magnetic recording (HAMR) data writer a separated from a data storage medium, the HAMR data writer comprising a laser and a near-field transducer;

writing a common test pattern to at least first and second data tracks of the data storage medium, the first and second data track each being immediately adjacent a median data track;

testing the HAMR data writer with a plurality of different laser powers to obtain a plurality of tested bit error rates (BER);

altering a default laser power to an optimized laser power in response to the plurality of tested BER reaching a predetermined threshold where a tested BER trend switches from a negative slope to a positive slope;

predicting a lifespan of a near-field transducer with the controller after selecting the laser power value; and writing user data to the median data track by heating the data storage medium with the optimized laser power.

19. The method of claim 18, wherein the controller immediately stops the testing step and sets a maximum laser power in response to the predetermined threshold being reached.

* * * * *